(12) United States Patent
Lin et al.

(10) Patent No.: US 11,135,037 B2
(45) Date of Patent: Oct. 5, 2021

(54) SELF-LOCKING ORTHODONTIC BRACKET

(71) Applicant: Zhejiang Shinye Medical Technology Corp., Ltd., Hangzhou (CN)

(72) Inventors: Quanhong Lin, Hangzhou (CN); Xianming Chen, Hangzhou (CN); Wangfeng Zhou, Hangzhou (CN)

(73) Assignee: ZHEJIANG SHINYE MEDICAL TECHNOLOGY CORP., LTD., Hangzhou (CN)

( * ) Notice: Subject to any disclaimer, the term of this patent is extended or adjusted under 35 U.S.C. 154(b) by 198 days.

(21) Appl. No.: 16/543,553

(22) Filed: Aug. 17, 2019

(65) Prior Publication Data
US 2020/0188064 A1    Jun. 18, 2020

(30) Foreign Application Priority Data

Dec. 17, 2018  (CN) .......................... 201811542697.X
Dec. 17, 2018  (CN) ........................... 201822119052.7

(51) Int. Cl.
*A61C 7/28*    (2006.01)
*A61C 7/34*    (2006.01)

(52) U.S. Cl.
CPC ................ *A61C 7/287* (2013.01); *A61C 7/34* (2013.01)

(58) Field of Classification Search
CPC .. A61C 8/287; A61C 8/34; A61C 8/12; A61C 8/14
See application file for complete search history.

(56) References Cited

U.S. PATENT DOCUMENTS

2009/0155734 A1*  6/2009  Damon .................. A61C 7/287
                                                    433/10
2017/0135787 A1*  5/2017  Lopes ....................... A61C 7/34

FOREIGN PATENT DOCUMENTS

CN       104970890      * 10/2015    .............. A61C 7/14

OTHER PUBLICATIONS

Machine translation for CN 104970890 (Year: 2015).*

* cited by examiner

*Primary Examiner* — Heidi M Eide (57) ABSTRACT

A self-locking orthodontic bracket includes a bracket body having a first surface and an arch-wire slot disposed on the first surface, a sliding cover matched with the bracket body and comprising a second surface towards the first surface, and a deformable locking element configured for locking the sliding cover on the bracket body. A positioning groove is disposed on the second surface. The first surface includes a guiding surface, and the second surface is slidably engaged with the guiding surface. A sinking groove is disposed on the guiding surface, and a bottom surface of the sinking groove is further provided with a locking groove. A lower part of the locking element is fixed in the locking groove, and an upper part of the locking element extends into the positioning groove, such that the sliding cover is slidably locked on the bracket body.

12 Claims, 9 Drawing Sheets

SELF-LOCKING ORTHODONTIC BRACKET

CROSS-REFERENCE TO RELATED APPLICATIONS

This application claims all benefits accruing under 35 U.S.C. § 119 from China Patent Application Nos. 201811542697.X, filed on Dec. 17, 2018, and 201822119052.7, filed on Dec. 17, 2018, in the China National Intellectual Property Administration, the content of which is hereby incorporated by reference.

TECHNICAL FIELD

The present disclosure relates to the field of dental medical devices, in particular, to a self-locking orthodontic bracket for orthodontic treatment.

BACKGROUND

A self-locking orthodontic bracket is an orthodontic device made of a metal or ceramic material that is fixed to a surface of the tooth by a special adhesive during orthodontic treatment of teeth. The self-locking orthodontic bracket can accommodate and further fix an orthodontic steel wire, and a force can be accurately transmitted to the teeth to be corrected, so as to achieve the purpose of orthodontic treatment. Compared with the traditional orthodontic technology, friction can be greatly reduced between the orthodontic steel wire and the self-locking orthodontic bracket, so that the tooth can move faster, thereby effectively shortening the entire treatment time.

In prior art, many orthodontic brackets are installed in a manner that a sliding cover is firstly installed in one side of a bracket, and a locking device is fixed from a reverse side of the bracket. The Chinese patent (Issued No. CN101815478B) disclosed an orthodontic bracket for mounting an arch-wire to the tooth, which adopts a pin as a fixing mechanism to fix the sliding cover on a bracket body. The installation and disassembly of the orthodontic bracket in use were complicated, and the fixing mechanism needs to install separately. The installation speed is slow, which brings great inconvenience to patients in the clinical application of orthodontics. Therefore, it is necessary to develop.

SUMMARY

In order to provide a self-locking orthodontic bracket which is convenient and easy to install, an embodiment of the present disclosure includes a self-locking orthodontic bracket including a bracket body having a first surface, an arch-wire slot is disposed on the first surface; a sliding cover matched with the bracket body and comprising a second surface towards the first surface of the bracket body; and a locking element configured for locking the sliding cover on the bracket body and able to deform. A positioning groove is disposed on the second surface of the sliding cover. The first surface of the bracket body includes a guiding surface, and a second surface of the sliding cover is slidably engaged with the guiding surface. A sinking groove is disposed on the guiding surface, and a bottom surface of the sinking groove is further provided with a locking groove. A lower part of the locking element is fixed in the locking groove, and an upper part of the locking element extends into the positioning groove, such that the sliding cover is slidably locked on the bracket body.

The positioning groove can include a first region and a second region opposite to each other. When the sliding cover is slidably locked to the bracket body along a sliding direction, a first side wall of the first region touches the locking element at first, and a gap is formed on the first side wall of the first region and configured for guiding the upper part of the locking element into the positioning groove.

A bottom of the gap parallel to the second surface of the sliding cover can be defined as a third surface, and a distance in a vertical direction between the third surface and a top edge of the sinking groove can be greater than a size of the locking element along the sliding direction of the sliding cover.

A distance in a vertical direction between the third surface and the guiding surface can be less than a height of a part of the locking element extending into the positioning groove.

A distance in a vertical direction between the third surface and the guiding surface can be less than a size of the locking element along the sliding direction of the sliding cover.

A middle part of a sidewall of the positioning groove can extrude and form a limiting protrusion, and the first region and the second region can be on two sides of the limiting protrusion.

A direction perpendicular to the sliding direction in the second surface can be defined as a second direction, and a size of the limiting protrusion extruding in the second direction can be less than a maximum elastic deformation of the locking element in the second direction.

A locking element can include a plurality of elastic rods parallel to each other.

Lower parts of the plurality of elastic rods can be independent with each other.

The size of the locking element along the sliding direction of the sliding cover can be a diameter of each of the plurality of elastic rods.

An inclined surface can be disposed on the bottom of the gap.

The self-locking orthodontic bracket of the present disclosure can have the positioning groove on the second surface of the sliding cover. The bracket body can be provided with the sinking groove. The locking groove can be formed in the sinking groove for installing the locking element. After the locking element is installed to the bracket body, the sliding cover can be directly pushed into the bracket body. The entire self-locking orthodontic bracket can be completed to assemble, and the slide cover can be prevented from falling off after being pushed in, which can simplify a process of the installation and increase speed of the installation.

DETAILED DESCRIPTION

The present disclosure will be further described in detail below with reference to the drawings and specific embodiments, in order to better understand the objective, the technical solution and the advantage of the present disclosure. It should be understood that the specific embodiments described herein are merely illustrative and are not intended to limit the scope of the disclosure.

It should be noted that when an element is referred to as being "fixed" to another element, it may be directly attached to the other element or a further element may be presented between them. When an element is considered to be "connected" to another element, it may be directly connected to the other element or connected to the other element through a further element (e.g., indirectly connected). The terms as used herein "vertical", "horizontal", "left", "right", and the like, are for illustrative purposes only and are not meant to be the only orientation.

Unless otherwise defined, all technical and scientific terms used herein have the same meaning as a skilled person in the art would understand. The terminology used in the description of the present disclosure is for the purpose of describing particular embodiments and is not intended to limit the disclosure.

Figure 1:
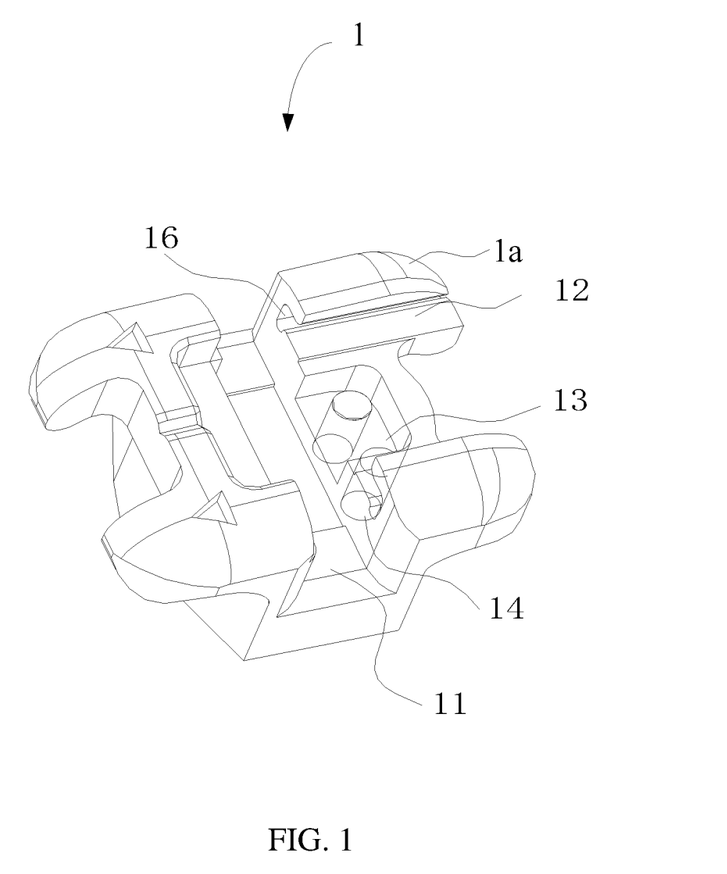
FIG. 1 is a perspective view of a bracket body of a self-locking orthodontic bracket according to an embodiment of the present disclosure.
Figure 2:
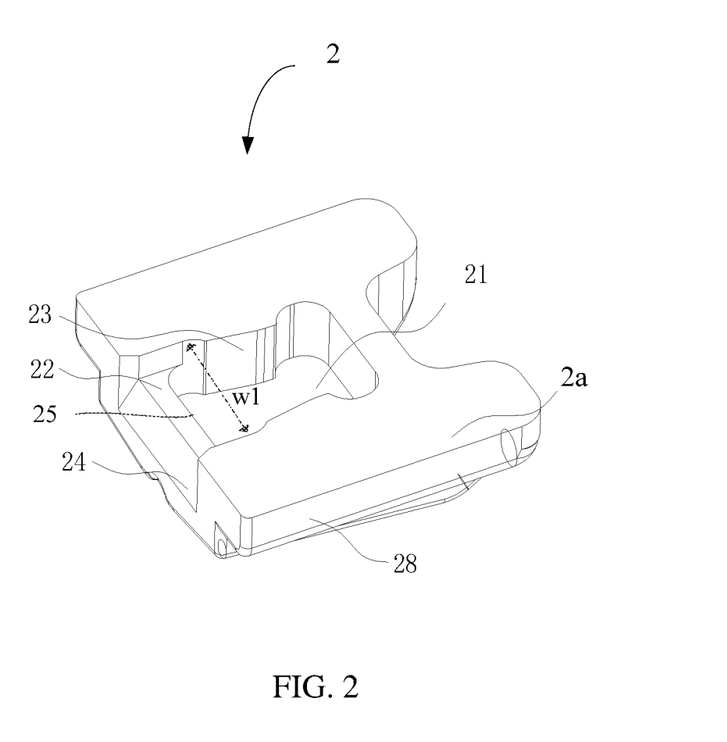
FIG. 2 is a perspective view of a sliding cover of a self-locking orthodontic bracket according to an embodiment of the present disclosure.

As shown in FIG. 1 to FIG. 12, a self-locking orthodontic bracket 100 is provided. Referring to FIG. 1 and FIG. 2, the self-locking orthodontic bracket 100 can include a bracket body 1, a sliding cover 2 and a locking element 3. The bracket body 1 can include a first surface 1a. An arch-wire slot 11 can be disposed on the first surface 1a and configured for accommodating an arch wire. The arch-wire slot 11 has an opening. The first surface 1a of the bracket body 11 can include a guiding surface 12. A sinking groove 13 is disposed on the guiding surface 12, and a bottom surface of the sinking groove 13 is further provided with a locking groove 14 configured for mounting the locking element 3. The sliding cover 2 can be matched with the bracket body 1 and have a second surface 2a towards the first surface 1a of the bracket body 1. A positioning groove 21 is disposed on the second surface 2a of the sliding cover 2. A lower part of the locking element 3 is fixed in the locking groove 14, and an upper part of the locking element 3 extends into the positioning groove 21, such that the sliding cover 2 is locked on the bracket body 1.

Figure 10:
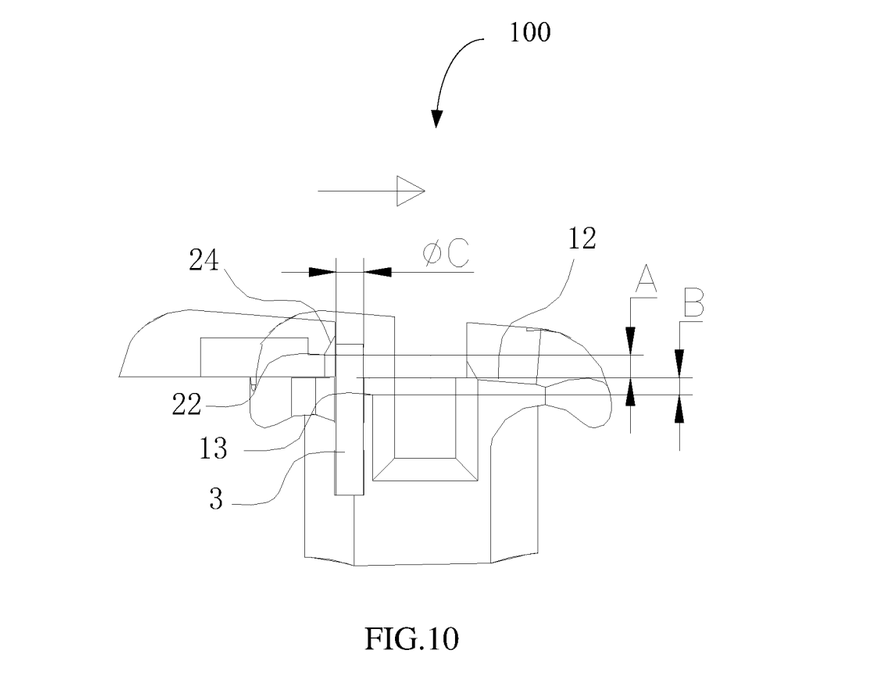
FIG. 10 is a side view of a part of a sliding cover end just contacting a locking member.

The second surface 2a of the sliding cover 2 can be slidably engaged with the guiding surface 12. Referring to FIG. 10, in a process of mounting the sliding cover 2 to the bracket body 1, a part of the sliding cover 2 abuts against the locking element 3. When further pushing the sliding cover 2, the upper part of the locking element 3 will bend and deform, and until entering into the positioning groove 21, the locking element 3 will return to an original shape by its own elasticity. That is, the upper part of the locking element 3 is disposed in the positioning groove 21 to prevent the sliding cover 2 from separating from the bracket body 1.

The sinking groove 13 can cause the upper part of the locking element 3 to deform and elongate. The upper part of the locking element 3 has a small bending angle at the same swinging amplitude. That is, the upper part of the locking element 3 is required to bend with a small angle along a sliding direction of the sliding cover 2, such that the sliding cover 2 will passed over the locking element 3 to complete mounting on the bracket body 1.

If the sinking groove 13 is not provided, the locking element 3 needs to be deformed at a large bending angle in the sliding direction of the sliding cover 2. A larger external force is required for pushing and installing the sliding cover, which is inconvenient to use, and excessive external force may also cause the locking element to break.

Figure 3:
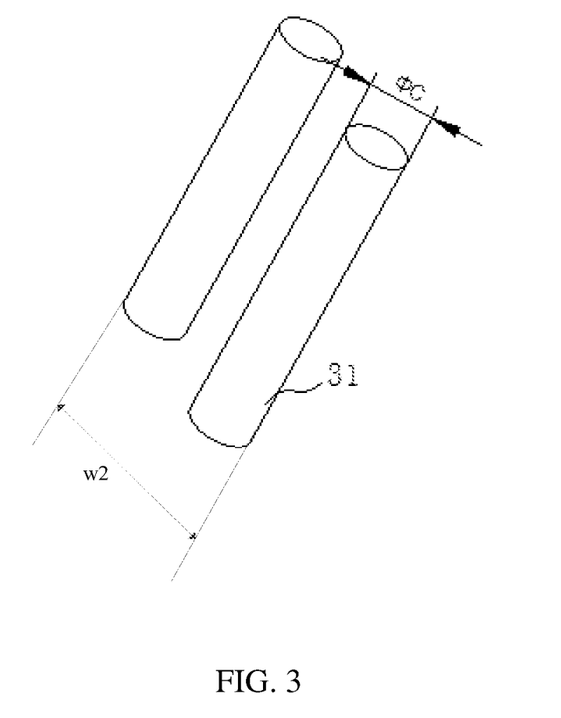
FIG. 3 is a perspective view of a locking element of a self-locking orthodontic bracket according to an embodiment of the present disclosure.

The locking element 3 can be the same as the prior art, or further improved. Referring to FIG. 3, the locking element 3 can include two first elastic rods 31 arranged side by side. The first elastic rods 31 can be cylindrical. The diameter of the first elastic rod 31 can be defined as $\Phi C$. The two first elastic rods 31 have the same diameter. A lower part of the first elastic rod 31 can be fixed in the locking groove 14. The shape of the locking groove 14 can be matched with the first elastic rod 31.

An upper part of the first elastic rod 31 extends through the sinking groove 13 and upward into the positioning groove 21 of the sliding cover 2, so that the sliding cover 2 can be locked on the bracket body 1. The two first elastic rods 31 are arranged in parallel and with the same height. The upper parts of the two first elastic rods 31 out of the locking groove 14 can be able to move relatively close together and return back. Through this deformation process, the sliding cover 2 can be switched and restricted at different positions.

The lower part of the two first elastic rods 31 can be independent with each other to avoid mutual interference or traction, and also facilitate flexible installation and standardization of components, and improve versatility.

The bottom of the locking element 3 can be fixed in the locking groove by means of bonding, welding, interference fit, and so on. The locking element 3 can be fixed in the locking groove 14 according to the shape and structure of the locking element 3 to achieve an overall stability and better fixing of the locking element 3.

Figure 4:
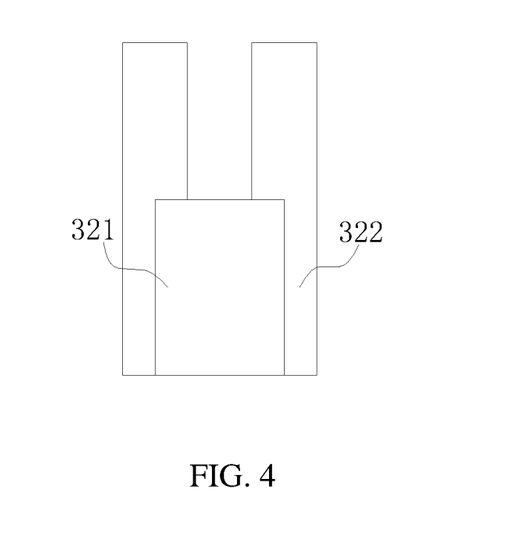
FIG. 4 is a perspective view of a locking element of a self-locking orthodontic bracket according to another embodiment of the present disclosure
Figure 6:
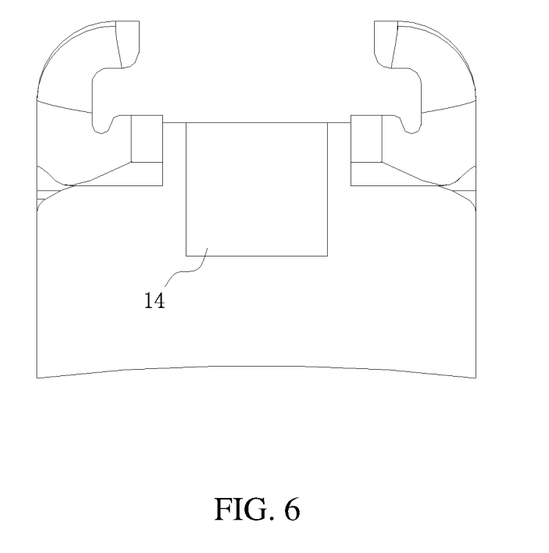
FIG. 6 is a side view of the bracket body of the self-locking orthodontic bracket in FIG. 1.

In an embodiment, referring to FIG. 4, the locking element 3 can include two second elastic rods 322 and a connecting portion 321 fixed between the two second elastic rods 322. The connecting portion 321 can be welded to the two second elastic rods 322. The connecting portion 321 and the bottom of the two second elastic rods 322 can be mounted in the locking groove 14 as shown in FIG. 6.

A top surface of the connecting portion 321 is not higher than a top edge of the sinking groove 13, so that only two second elastic rods 322 protrude from the locking groove 141, and both the two second elastic rods 322 are cylindrical, arranged parallel to each other and at the same height.

Figure 5:
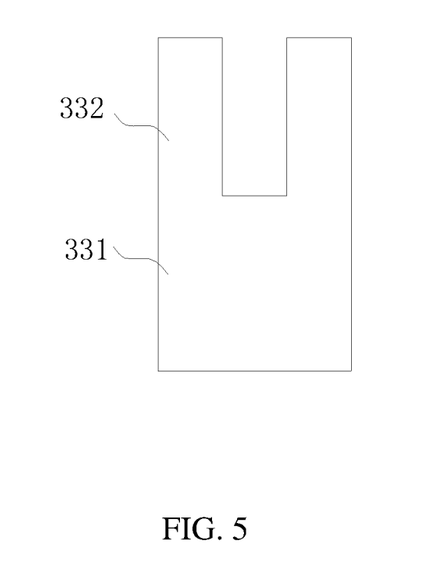
FIG. 5 is a perspective view of a locking element of a self-locking orthodontic bracket according to another embodiment of the present disclosure.

In another embodiment, referring to FIG. 5, the locking element 3 includes a base 331 and two third elastic rods 332, which are integrally formed. A gap between the two elastic third elastic rods 332 can be formed by cutting.

Figure 9:
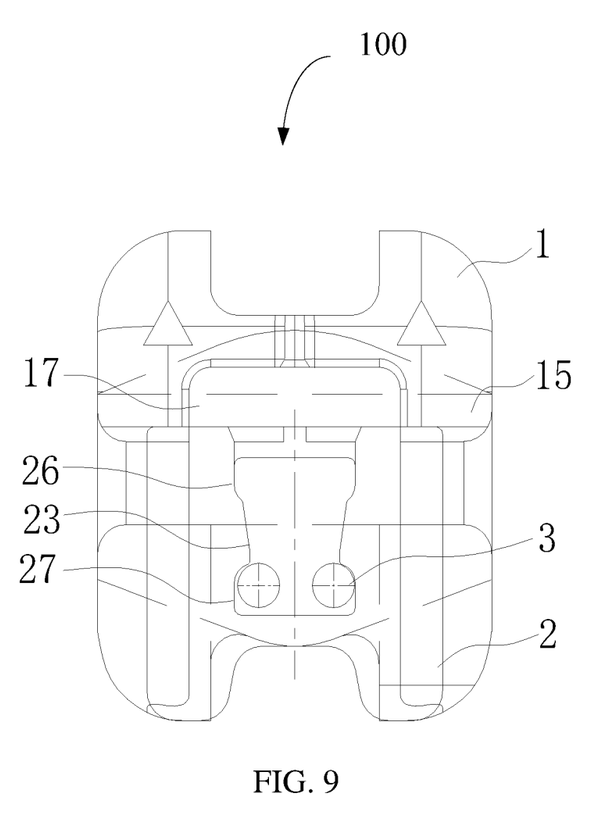
FIG. 9 is a top view of a sliding cover in a closed state.

Referring to FIG. 9, after passing over the arch-wire slot 11, the sliding cover 2 can cover and a part of the sliding cover 2 will touch the other edge of the arch-wire slot 11. In order to prevent being loosened, in one embodiment, a limiting groove 15 can be disposed on the bracket body 1 and especially on the other edge of the arch-wire slot 11 (as shown in FIG. 9). In a state where the sliding cover 2 closes the main arch-wire slot 11, the sliding cover 2 extends along the guiding surface 12, covers the arch-wire slot 11 and inserts into the limiting groove 15. An edge portion of the sliding cover 2 can be received and restrained by the limiting groove 15.

In order to smoothly guide a movement of the sliding cover 2, in one embodiment, the guiding surface 12 of the bracket body 1 can be provided with a slide way 16 on both sides thereof (as shown in FIG. 1). Correspondingly, both sides of the sliding cover 2 have sliders 28 matched with the slide ways 16 (as shown in FIG. 2). As the sliding cover 2 slides, the sliding cover 28 can move back and forth along the slide ways 16. The slide ways 16 on both sides of the bracket body 1 and the sliders 28 on both sides of the sliding cover 2 make the sliding cover 2 closely fit with the guiding surface 12 of the bracket body 1 during the sliding process. The sliding cover 2 can be installed more smoothly, so as to avoid derailing the sliding cover 2 under a larger external force.

In an embodiment, a cover opening 17 configured for driving the sliding cover 2 to exit from the limiting groove 15 is provided on the bracket body 1 and located between a side wall of the limiting groove 15 and the sliding cover 2. When the sliding cover 2 is kept in a state of closing the arch-wire slot 11, the edge portion of the sliding cover 2 is inserted into the limiting groove 15, and the sliding cover 2 abuts against the side wall of the limiting groove 15. A tool can be conveniently inserted into the cover opening 17, and sufficient force can be provided to push the sliding cover 2 to overcome a limiting protrusion 23, thereby releasing the locking of the first elastic rod 31, so as to open the sliding cover 2.

Figure 7:
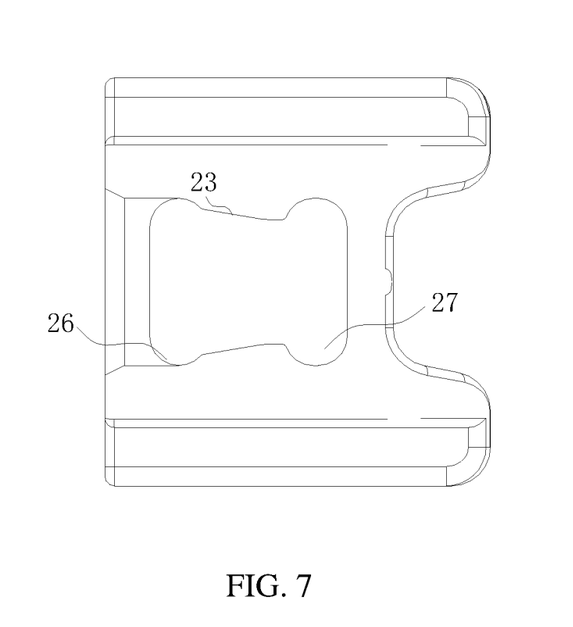
FIG. 7 is a top view of the sliding cover of the self-locking orthodontic bracket in FIG. 2.

In one embodiment, the sliding cover 2 is provided with a positioning groove 21 on the second surface 2a that is slidably matched with the first surface 1a of the bracket body. Referring to FIG. 7, the positioning groove 21 can include a first region 26 and a second region 27 opposite to each other. Referring to FIG. 2, when the sliding cover 2 is slidably locked to the bracket body 1 along a sliding direction, a first side wall 25 of the first region 26 will touch the locking element 3 at first, and a gap 22 is formed on the first side wall 25 of the first region 26 and configured for guiding the upper part of the locking element 3 into the positioning groove 21.

Referring to FIG. 10, a bottom of the gap parallel to the second surface of the sliding cover is defined as a third surface.

A distance in a vertical direction between the third surface and the guiding surface 12 is defined as A. A distance in a vertical direction between a top edge of the sinking groove 13 and the guiding surface 12 is defined as B. A size of the locking element along the sliding direction of the sliding cover (i.e., the diameter or thickness of the first elastic rod 31) is defined as ΦC.

The sliding cover 2 is pushed along the guiding surface 12, firstly blocked by the first elastic rod 31, and the edge portion of the sliding cover 2 will apply a force on the first elastic rod 31 to drive the first elastic rod 31 to bend in the sliding direction of the sliding cover 2. A distance in a vertical direction between the third surface and the top edge of the sinking groove 13 defined as A plus B is larger than ΦC. The proper space will allow the first elastic rod 31 to have sufficient space to bend, allowing the sliding cover 2 to be installed to the bracket body 1.

If the distance in the vertical direction between the third surface and the top edge of the sinking groove 13 defined as A plus B is less than ΦC, it is possible that the sliding cover 2 will be blocked by the first elastic rod 31, that is, even if the first elastic rod 31 is bent with 90 degrees, there is no sufficient space to accommodate the first elastic rod 31, and the sliding cover 2 cannot pass over the first elastic rod 31 or be installed to the bracket body 1.

Figure 11:
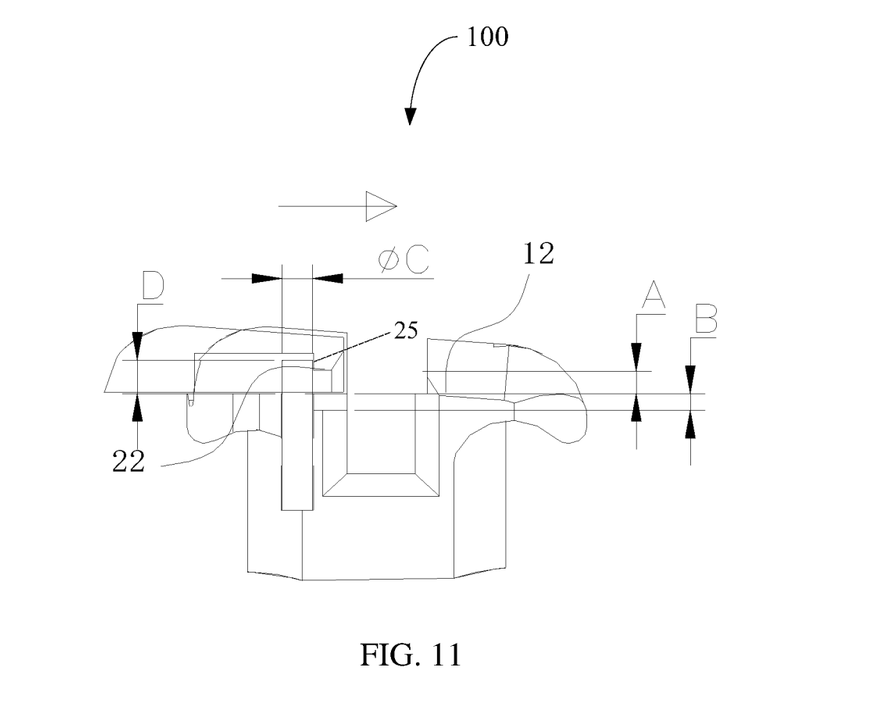
FIG. 11 is a side view of the sliding cover in an open state in FIG. 8.
Figure 12:
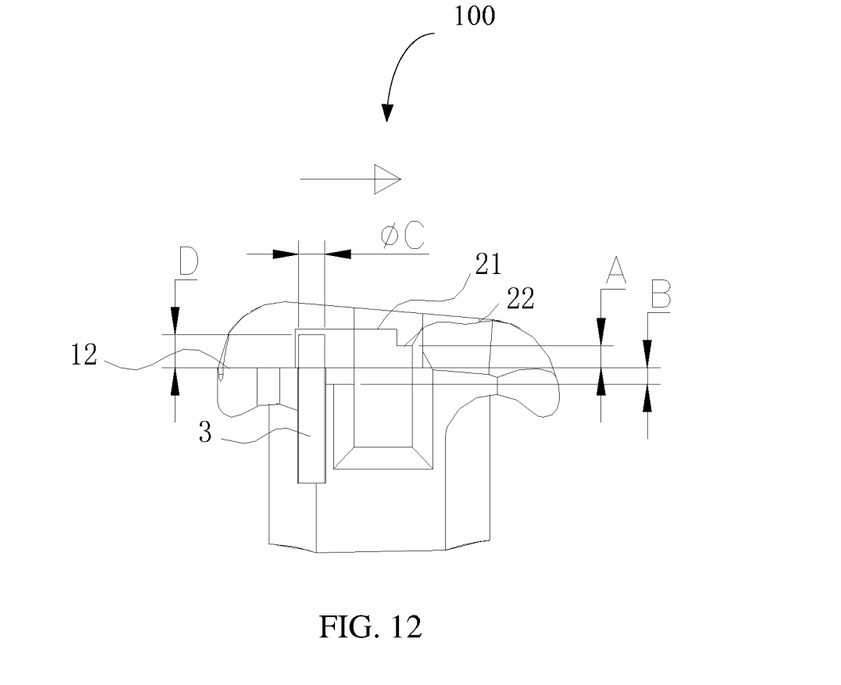
FIG. 12 is a side view of the sliding cover in a closed state in FIG. 9.

Referring to FIG. 11, when the sliding cover 2 is retracted to an extreme position, the first elastic rod 31 contacts the first side wall 25 of the positioning groove 21, and a height of the first elastic rod 31 extending into the positioning groove 21 is defined as D. The sliding cover 2 is in an open position of the entire self-locking orthodontic bracket. The distance A between the third surface and the guiding surface 12 is smaller than the height D, and the distance A is smaller than the size ΦC of the locking element 3 in the sliding direction of the sliding cover, so when the sliding cover 2 is retracted to the extreme position, the first side wall 25 of the sliding cover 2 will be blocked by the first elastic rod 31, and the third surface and the guiding surface 12 respectively form shearing forces on opposite sides of the locking element 3, which will drive the locking element 3 to bend. If the distance A between the third surface and the guiding surface 12 is greater than the size ΦC of the locking element 3 in the sliding direction, the locking element 3 will bend and the sliding cover 2 will slide out and cannot be blocked. Therefore, the distance A should be smaller than the size ΦC of the locking element 3 in the sliding direction of the sliding cover.

Figure 8:
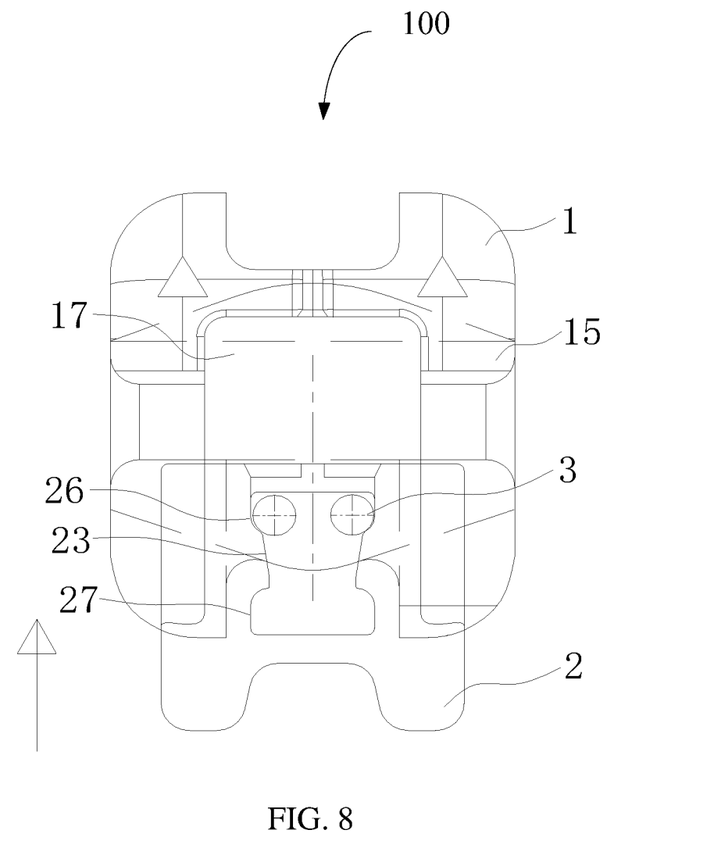
FIG. 8 is a top view of a sliding cover in an open state, wherein the arrow indicates a sliding direction of the sliding cover.

The positioning groove 21 can be coupled to the first elastic rod 31 by the shape of its side wall. Referring to FIG. 7, in an embodiment, a middle part of a sidewall of the positioning groove 21 extrudes and forms a limiting protrusion 23. The first region 26 and the second region 27 are on two sides of the limiting protrusion 23. As shown in FIG. 8 and FIG. 9, the first limiting area 26 and the second limiting area 27 respectively correspond to the positions of the first elastic rod 31 when the sliding cover 2 opens and closes the arch-wire slot 11.

During the movement of the sliding cover 2 from the open state of the arch-wire slot 11 to the closed state of the arch-wire slot 11, the first elastic rod 31 will be elastically deformed by the pressing of the limiting protrusion 23 along a direction perpendicular to the sliding direction of the sliding cover 2. The direction perpendicular to the sliding direction in the second surface is defined as a second direction. Due to a size of the limiting protrusion 23 extruding in the second direction is less than a maximum elastic deformation of the locking element 3 in the second direction, the first elastic rod 31 can flexibly bend and pass over the limiting protrusion 23 to enter the second region 27. The first elastic rod 31 can recover from the elastic deformation after entering the second region 27. Due to the limiting protrusion 23, the first elastic rod 31 cannot return along an original moving path, except for being applied by an external force, thereby realizing the sliding cover 2 in the closed position.

Furthermore, referring to FIG. 2 and FIG. 3, a maximum width w1 of the positioning groove in the second direction is less than a width w2 of the locking element in the second direction. Therefore, if the locking element 3 is disposed in the positioning groove 21, the locking element 3 slightly deforms and locks the sliding cover 2 on the bracket body 1.

In an embodiment, referring to FIG. 2, the sliding cover 2 is provided with an inclined surface 24 on the bottom of the gap 22. The inclined surface 24 can be configured for making the first elastic rod 31 bend easier when the sliding cover 2 is installed on the bracket body 1. The inclined surface 24 will facilitate the locking element 3 to enter the positioning groove 21.

In an installing of the self-locking orthodontic bracket 100 of the present disclosure, the first surface 1a of the bracket body 1 faces upward, and the first elastic rod 31 can be inserted into the locking groove 14, and the second surface 2a of the sliding cover 2 faces the first surface 1a of the bracket body 1. The sliding cover 2 is placed on the guiding surface 12 of the bracket body 1. The sliders 28 on both sides of the sliding cover 2 are inserted into the guiding ways 16, while ensuring the upper part of the first elastic rod 31 extends into the first region 26 of the positioning groove 21. Then the sliding cover 2 is pushed to move along the guiding ways 16, and pass over the arch-wire slot 11 and insert into the limiting groove 1. At this time, due to the pushing of the sliding cover 2, the first elastic rod 31 overcomes the elastic force itself and passes over the limiting protrusion 23 to reach the second region 27.

When the self-locking orthodontic bracket 100 needs to be released, an external force is used to push the sliding cover 2 to exit along the guide surface 12. During the movement of the sliding cover 2, the first elastic rod 31 will deform along the second direction because of the limiting protrusion 23. The first elastic rod 31 will return to the first region 26, and the sliding cover 2 is in the released position as the arch-wire slot 11 is opened. In the process of releasing, an external force is required to make the locking element 3 elastically deform in the second direction, thereby ensuring reliability of the locked state. If there is insufficient external force, the locking element 3 does not deform.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A self-locking orthodontic bracket, comprising:
a bracket body having a first surface and an arch-wire slot disposed on the first surface;
a sliding cover matched with the bracket body and comprising a second surface towards the first surface of the bracket body; and
a deformable locking element configured for locking the sliding cover on the bracket body,
wherein a positioning groove is disposed on the second surface of the sliding cover, the first surface of the bracket body comprises a guiding surface, and the second surface of the sliding cover is slidably engaged with the guiding surface;
a sinking groove is disposed on the guiding surface, the sinking groove comprises a plurality of sidewalls and a bottom surface, the bottom surface of the sinking groove is further provided with a locking groove; the locking element is spaced away from the plurality of sidewalls of the sinking groove, a lower part of the locking element is fixed in the locking groove, and an upper part of the locking element extends into the positioning groove, such that the sliding cover is slidably locked on the bracket body.

2. The self-locking orthodontic bracket of claim 1, wherein the positioning groove comprises a first region and a second region opposite to each other, when the sliding cover is slidably locked to the bracket body along a sliding direction, a first side wall of the first region touches the locking element at first, and a recess is formed on the first side wall of the first region and configured for guiding the upper part of the locking element into the positioning groove.

3. The self-locking orthodontic bracket of claim 2, wherein a bottom surface of the recess parallel to the second surface of the sliding cover is defined as a third surface, and a distance in a vertical direction between the third surface and a top edge of the sinking groove is greater than a size of the locking element along the sliding direction of the sliding cover.

4. The self-locking orthodontic bracket of claim 3, wherein the deformable locking element comprises a plurality of elastic rods parallel to each other.

5. The self-locking orthodontic bracket of claim 3, wherein an inclined surface is disposed on the bottom surface of the recess.

6. The self-locking orthodontic bracket of claim 4, wherein lower parts of the plurality of elastic rods are independent with each other.

7. The self-locking orthodontic bracket of claim 4, wherein the size of the locking element along the sliding direction of the sliding cover is a diameter of each of the plurality of elastic rods.

8. The self-locking orthodontic bracket of claim 2, wherein a bottom surface of the recess is defined as a third surface, the third surface is parallel to the second surface of the sliding cover, a distance in a vertical direction between the third surface and the guiding surface is less than a height of a part of the locking element extending into the positioning groove.

9. The self-locking orthodontic bracket of claim 2, wherein a bottom surface of the recess is defined as a third surface, the third surface is parallel to the second surface of the sliding cover, a distance in a vertical direction between the third surface and the guiding surface is less than a size of the locking element along the sliding direction of the sliding cover.

10. The self-locking orthodontic bracket of claim 2, wherein a middle part of a sidewall of the positioning groove extrudes and forms a limiting protrusion, and the first region and the second region are on two sides of the limiting protrusion.

11. The self-locking orthodontic bracket of claim 10, wherein a direction perpendicular to the sliding direction in the second surface is defined as a second direction, and a size of the limiting protrusion extruding in the second direction is less than a maximum elastic deformation of the locking element in the second direction.

12. The self-locking orthodontic bracket of claim 10, wherein a maximum width of the positioning groove in the second direction is less than a width of the locking element in the second direction.

* * * * *